United States Patent

Alling et al.

[11] 3,913,994
[45] Oct. 21, 1975

[54] BEARING OFFSET LIP CAGE

[75] Inventors: Richard Alling; John R. Hull, both of Litchfield, Conn.

[73] Assignee: The Torrington Company, Torrington, Conn.

[22] Filed: Aug. 20, 1973

[21] Appl. No.: 389,810

[52] U.S. Cl. ............................... 308/235; 308/217
[51] Int. Cl.² .......................................... F16C 33/38
[58] Field of Search ............................. 308/235, 217

[56] References Cited
UNITED STATES PATENTS

| | | | |
|---|---|---|---|
| 1,242,911 | 10/1917 | Beemer | 308/235 |
| 1,390,717 | 9/1921 | Keeper | 308/235 |
| 3,644,007 | 2/1972 | Alling | 308/235 |
| 3,713,713 | 1/1973 | Alling et al. | 308/235 |
| 3,778,124 | 12/1973 | Alling | 308/235 |

FOREIGN PATENTS OR APPLICATIONS

| | | | |
|---|---|---|---|
| 37,769 | 11/1912 | Sweden | 308/235 |
| 140,390 | 11/1920 | United Kingdom | 308/235 |

Primary Examiner—M. Henson Wood, Jr.
Assistant Examiner—Richard A. Bertsch
Attorney, Agent, or Firm—Frank S. Troidl

[57] ABSTRACT

A bearing retainer is disclosed which includes two ring-shaped retainer members. The retainer members are interfitted at at least one of their peripheries. A lip extends axially from one of the retainer member toward the other retainer member. The length of the lip is substantially less than the total length of the assembled retainer.

The new retainer with rolling members may be used as a complete thrust bearing or may be used in an assembly with one or two races.

15 Claims, 20 Drawing Figures

BEARING OFFSET LIP CAGE

This invention relates to bearings. More particularly, this invention is a novel bearing retainer and novel bearing assembly.

Thrust bearing retainers have been developed which include two retainer members. Examples of such retainers are shown in U.S. Pat. No. 2,724,625 issued Nov. 22, 1955 to R. H. White and U.S. Pat. No. 3,644,007 issued Feb. 22, 1972 to R. L. Alling. The advantages of a two-piece retainer over a one-piece retainer is that there is better rolling member retention and in many cases better rolling member guidance. An internal grease pocket is provided between the two pieces for lubricant retention. This is important because the lubricant tends to be thrown away from the bearing under high centrifugal force. The two-piece retainer keeps the lubricant in the pocket.

These retainers with rolling members may be used as a complete bearing or as a bearing in a bearing assembly. Examples of the use of a one-piece retainer in an assembly are shown in U.S. Pat. No. 2,997,349 issued Aug. 22, 1961 to A. O. Pitner. Examples of bearing assemblies with two-piece retainers are shown by U.S. Pat. No. 3,713,713 issued Jan. 30, 1973 to R. L. Alling et al.

Our new retainer has a structure which facilitates the placement of the retainer in a race to provide a bearing assembly. Briefly described, our new bearing retainer comprises two axially spaced radially extending ring-shaped retainer members. The retaining members have opposed circumferentially spaced radial slots containing rolling members. The rolling members may be either needles or rollers or any other suitable rolling member. Those skilled in the art of bearings usually differentiate needles from rollers by the length-to-diameter ratio. The length-to-diameter ratio of needles is greater than the length-to-diameter ratio of rollers.

The two retainer members are interfitted at either or both the inside peripheries and the outside peripheries. The novel structure includes a lip extending axially from the first retainer member in the direction of the second retainer member. The length of the lip is less than the total length of the assembled retainer. The length of the lip is sufficiently less than the total length of the assembled retainer so that the retention tabs or rim on an enclosing bearing race need not extend beyond the plane of the opposing raceway. For needles, the lip will normally be up to one-half the length of the total length of the assembled retainer; for rollers, the length may be more than one-half the total length of the assembled retainers but will still be less than the total length of the assembled retainer.

The invention as well as its many advantages may be further understood by reference to the following detailed description and drawings in which.

In the figures, like parts will be referred to by like numbers.

Figure 1:
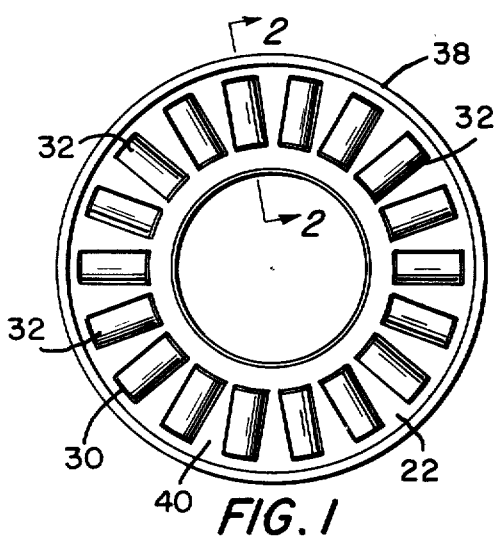
FIG. 1 is an elevational view of our new retainer.
Figure 2:
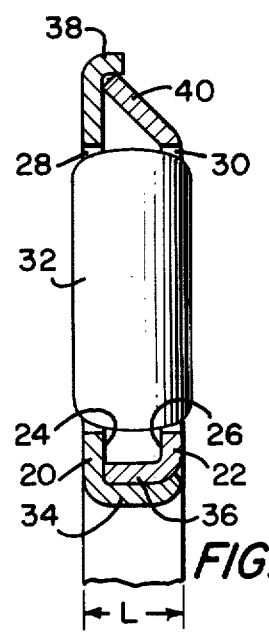
FIG. 2 is an enlarged view taken along lines 2—2 of FIG. 1.

Referring to the drawings and particularly to FIG. 1 and FIG. 2, our new retainer includes two ring-shaped retainer members 20 and 22 with axially spaced radially extending inside faces 24 and 26, respectively. The retainer members 20 and 22 have a series of slots 28 and 30, respectively. Rolling members, such as rollers 32, are located in each of the slots. The slots are circumferentially spaced and in opposed relationship.

Flange 34 on retaining member 20 overlaps flange 36 on retaining member 22. The first retainer member 20 has a lip 38 on its outer diameter which extends over an angled portion 40 which extends angularly from the inside face 26 of retainer member 22. The edge of angled portion 40 fits snugly within the inside of the lip 38. As can be clearly seen in FIG. 2, the length of the lip 38 extends only a small part of the total length L of the assembled retainer which includes retainer members 20 and 22.

Figure 3:
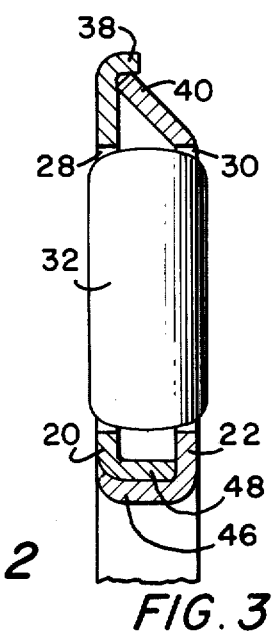
FIGS. 3 through 13 are sectional views showing modification of our new retainer.

In the embodiment shown in FIG. 3, the retainer members 20 and 22 are interfitted at the inside diameter with the flange 46 of retainer member 22 overlapping flange 48 of retainer member 20.

Figure 4:
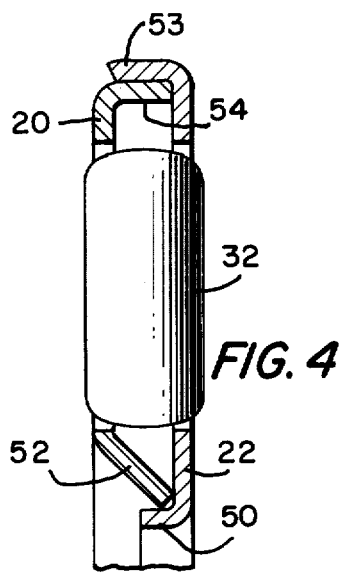

In FIG. 4, the lip 50 is provided on the inside diameter of the retainer member 22 and extends over the inner periphery of angled portion 52 of retainer member 20. The edge of angled portion 52 fits snugly inside the lip 50. Flange 53 on retainer member 22 overlaps flange 54 on retainer member 20 on the outside diameter.

Figure 5:
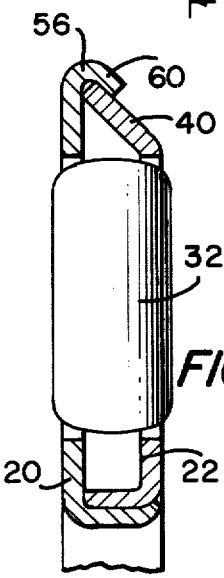
Figure 6:
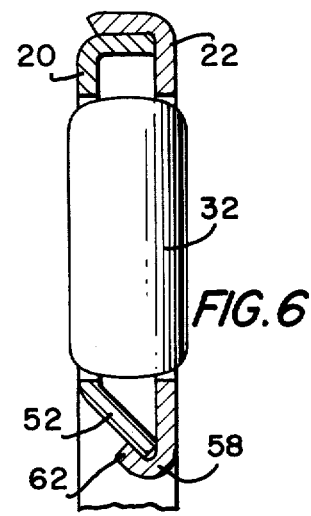

In the embodiments shown in FIG. 5 and FIG. 6, the lip 56 of FIG. 5 and lip 58 of FIG. 6 include radially turned in portion 60 and turned out portion 62, respectively. These portions 60 and 62 overlap the angled portions 40 and 52, respectively.

Figure 7:
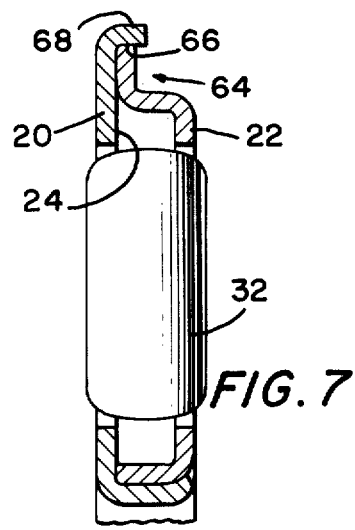
Figure 8:
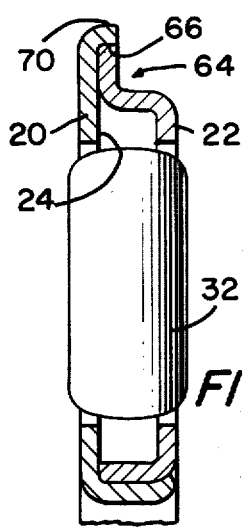
Figure 9:
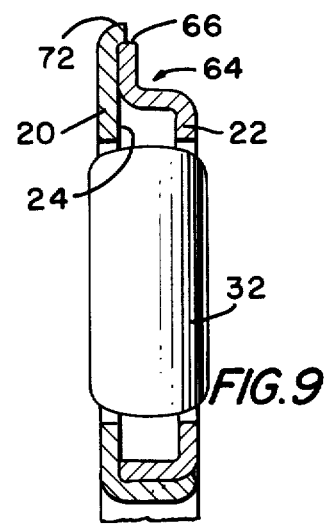

In the embodiments shown in FIG. 7, FIG. 8, and FIG. 9 the second retainer member 22 has a portion 64 extending first axially toward the first retainer member 20 and then radially along the inside face 24 of the first retainer member. The edge 66 of portion 44 is in contact with the inside of the lip 68. In FIG. 7, lip 68 extends over the outside of edge 66; in FIG. 8, the edge of lip 70 is flush with the outside of edge 66; in FIG. 9, the lip 72 extends approximately midway across the edge 66.

Figure 10:
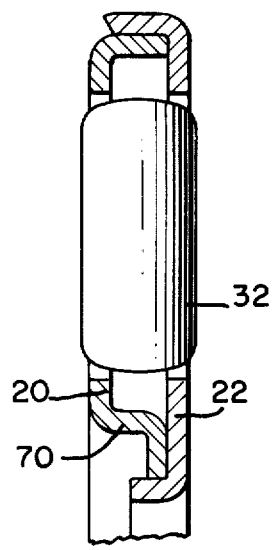

In FIG. 10, the portion 70 on the race 20 is located on the inside diameter rather than the outside diameter as in FIGS. 7 through 9.

Figure 11:
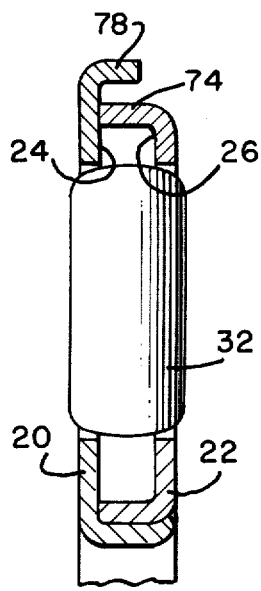

In FIG. 11, the second retainer member 22 has a lip 74 extending from the outer diameter of face 26. The edge 76 of lip 74 contacts the inside face 24 of retainer member 20. The lip 74 is radially spaced from lip 78.

Figure 12:
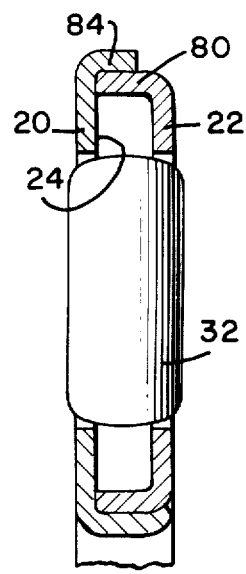

In the embodiment shown in FIG. 12 the lip 80 on retainer member 22 fits snugly against the inside of lip 84 on retainer member 20 so that the lip 80 contacts both the face 24 of retainer member 20 and the inside of lip 84.

Figure 13:
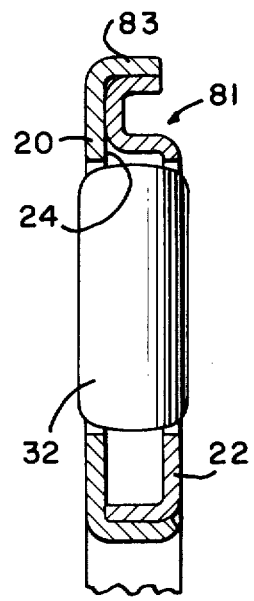

In the embodiment shown in FIG. 13, the retainer member 22 has a portion 81 extending first axially toward retainer member 20, then radially along the face 24 of the retainer member 20, and then axially along the inside of lip 83.

Figure 14:
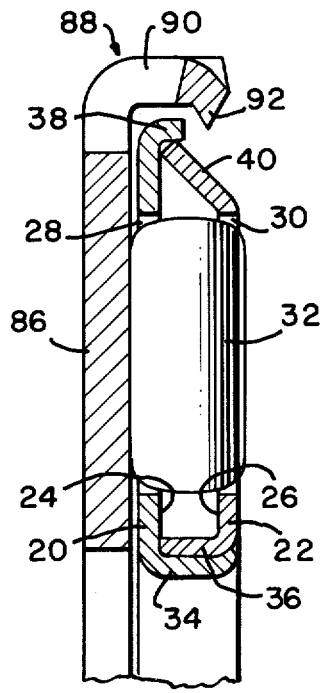
FIG. 14 is a sectional view showing our new one-race assembly.

FIG. 14 shows the retainer of FIG. 2 fitted in a single race 86 to provide a bearing assembly. The ring-shaped race 86 extends parallel to the outer face of retainer member 20. A straddling means 88 is connected to the outside diameter of race 86. The straddling means 88 includes a flange 90 and a tab 92 projecting from the flange 88 inwardly and toward the race 86. At least one, and preferably three or more spaced apart tabs should be used.

Though FIG. 14 shows a flange and tab straddling means, any other appropriate straddling means may be used including an annular flange of U-shaped cross section such as shown with the one-piece retainer disclosed in the Pitner U.S. Pat. No. 2,997,349, or three or more tabs extending axially and inwardly from the race.

Figure 15:
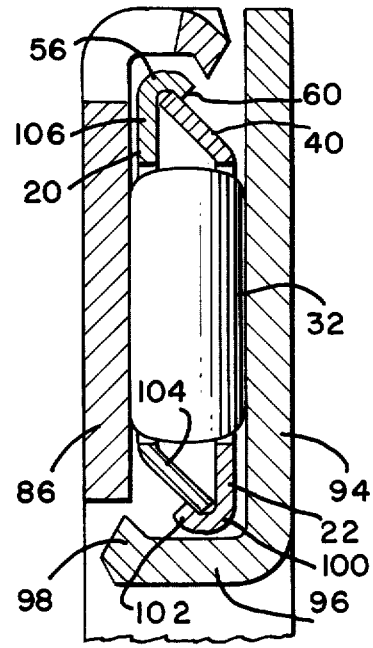
FIG. 15 is a sectional view showing a two-race assembly with still another retainer modification.

In FIG. 15, a second race 94 extending radially parallel to the outer face of the second retainer member is provided. The flange 96 with the inwardly turned tabs 98 is provided on the second race 94 which overlaps the inside diameter of the assembled retainer. The new retainer includes angled portion 40 on retainer member 22 and lip 56 with turned-in end 60 as in the embodiment of FIG. 5. However, in the retainer embodiment of FIG. 15, retainer member 22 has an axial lip 100 with turned out portions 102 extending over angled portion 104 extending angularly from face 106 of retainer member 20.

Figure 16:
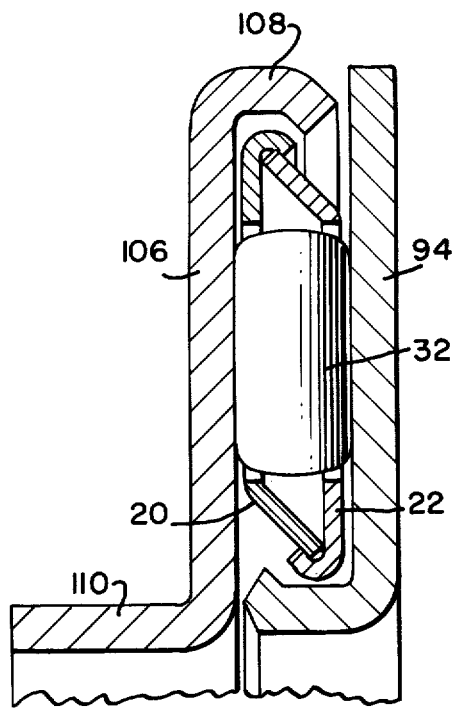
FIG. 16 is a sectional view of another two-race assembly modification.

The embodiment of FIG. 16 is similar in structure to the embodiment of FIG. 15 except that a race 106 with a full annular flange 108 and an extended inner flange 110 is substituted for the race 86 having the tabs 92.

Figure 17:
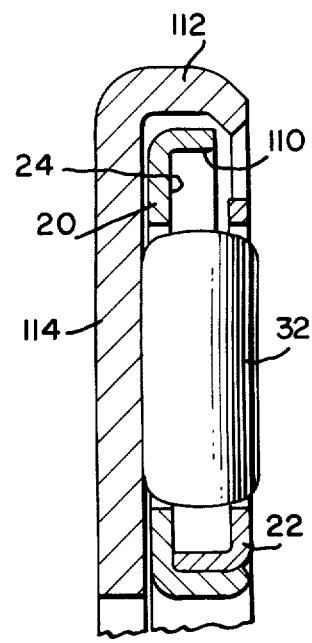
FIGS. 17 through 20 are sectional views showing still further modifications of our new retainer in a one-race assembly.

In the embodiment of FIG. 17, the lip 110 extends from inside face 24 of retainer member 20 to a point both radially and axially spaced from the outside diameter of retainer member 22. The lip 110 fits inside annular flange 112 on race 114.

Figure 18:
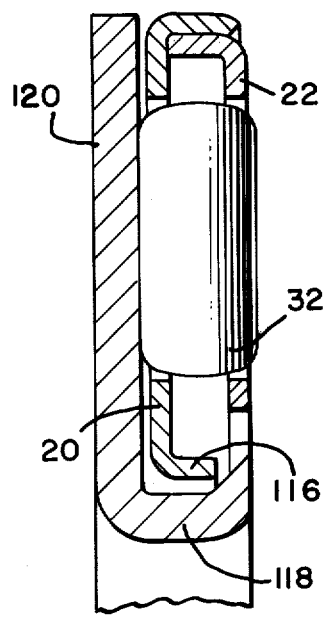

In FIG. 18, the lip 116 is on the inside diameter of retainer member 20 and fits over the annular flange 118 on the inside diameter of race 120.

Figure 19:
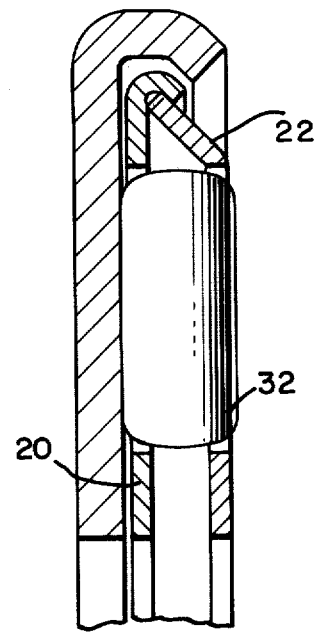
Figure 20:
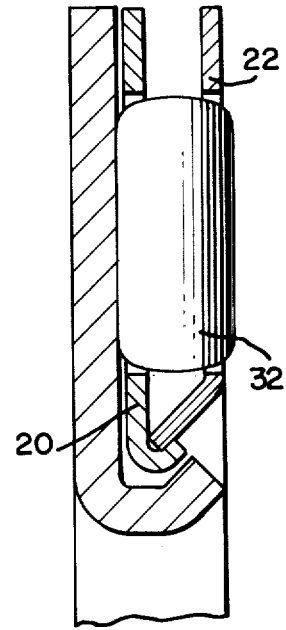

The assembled retainer shown in FIGS. 19 and 20 with one race are similar to the assembled retainers shown in FIGS. 5 and 6, respectively except that in FIG. 19, retainer members 20 and 22 are not interfitted at their inside diameters and in FIG. 20, they are not interfitted at their outside diameters.

Two big advantages of our new retainer are that the retainer is conveniently assembled to the cooperating thrust race with the assembly having a small axial overall length, and the lip adds a comparatively large smooth surface for contacting the inside surface of the straddling means on the race or races, as compared to the thrust bearing of White U.S. Pat. No. 2,724,625. This reduces wear and tear on the outer edges of the two-piece retainer and on the inner surface of the axial lip of the race.

We claim:

1. A bearing retainer comprising: two ring-shaped retainer members with axially spaced radially extending inside faces having opposed circumferentially spaced radial slots; said retainer members being interfitted at at least one of their peripheries with the first retainer member having a lip extending axially in the direction of the second retainer member, the length of said lip being sufficiently less than the total length of the assembled retainer, so that retention means on an enclosing bearing race does not extend beyond the plane of the opposing raceway.

2. A bearing retainer in accordance with claim 1 wherein the retainer members are interfitted at only one periphery; and the lip is located on the first retainer member at the other periphery, the end of said lip being both radially and axially spaced from said other periphery of the second retainer member.

3. A bearing retainer in accordance with claim 2 wherein the lip is on the outside diameter of the first retainer member.

4. A bearing retainer in accordance with claim 2 wherein the lip is on the inside diameter of the first retainer member.

5. A bearing retainer in accordance with claim 1 wherein the retainer members are interfitted at only one periphery by said lip extending over said one periphery of the second retainer member.

6. A bearing retainer in accordance with claim 1 wherein said retainer members are interfitted at their inside diameters and interfitted at their outside diameters, and at least one of said interfits includes said lip which extends over the second retainer member.

7. A bearing retainer in accordance with claim 6 wherein the second retainer member has an angled portion extending angularly from its face and in contact with the inside of the lip on the first retainer member.

8. A bearing retainer in accordance with claim 7 wherein said lip has a radially turned in portion overlapping said angled portion.

9. A bearing retainer in accordance with claim 6 wherein the second retainer member has a portion extending first axially toward the first retainer member and then radially along the face of the first retainer member with the edge of said portion in contact with the inside of the lip.

10. A bearing retainer in accordance with claim 6 wherein the second retainer member has a lip extending axially from its face with its edge in contact with the face of the first retainer member.

11. A bearing retainer in accordance with claim 10 wherein the lip extending axially from the second retainer member also contacts the inside of the lip extending axially from the first retainer member.

12. A bearing retainer in accordance with claim 6 wherein the second retainer member has a portion extending first axially toward the first retainer member, then radially along the face of the first retainer member and then axially along the inside of the lip.

13. A thrust bearing assembly comprising: two ring-shaped retainer members with axially spaced radially extending inside faces having opposed circumferentially spaced radial slots, said retainer members being interfitted at at least one of their peripheries with the first retainer member having a lip extending axially in the direction of the second retainer member, the length of said lip being substantially less than the total length of the assembled retainer; a ring-shaped race radially extending parallel to the outer face of the first retainer member; and straddling means connected to the race and straddling the lip on the first retainer member.

14. A thrust bearing assembly in accordance with claim 13 wherein the lip on the first retainer member extends over the second retainer member at one periphery, a second ring-shaped race extends radially parallel to the outer face of the second retainer member; the second retainer member has a lip extending over the first retainer member at the other periphery; and straddling means are connected to the second ring-shaped race and straddling said other periphery end of the assembled retainer.

15. A thrust bearing assembly in accordance with claim 13 wherein said straddling means comprises: a flange integral with and projecting axially from the outer diameter of the race; and at least one tab projecting from the flange inwardly toward the race.

* * * * *